(12) United States Patent
Zarzycki et al.

(10) Patent No.: US 8,239,867 B2
(45) Date of Patent: Aug. 7, 2012

(54) METHOD AND APPARATUS FOR IMPLEMENTING ATOMIC FIFO

(75) Inventors: David A. Zarzycki, San Francisco, CA (US); Kevin James Van Vechten, Mountain View, CA (US); Joshua Osborne, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 547 days.

(21) Appl. No.: 12/477,767

(22) Filed: Jun. 3, 2009

(65) Prior Publication Data

US 2010/0313208 A1    Dec. 9, 2010

(51) Int. Cl.
*G06F 9/46* (2006.01)
(52) U.S. Cl. .................. 718/100; 718/102; 718/106
(58) Field of Classification Search .......... 718/100, 718/102, 106; 719/313, 315
See application file for complete search history.

(56) References Cited

U.S. PATENT DOCUMENTS

| | | | |
|---|---|---|---|
| 5,465,363 A * | 11/1995 | Orton et al. ............. | 718/107 |
| 5,671,446 A * | 9/1997 | Rakity et al. ............ | 710/54 |
| 6,094,663 A | 7/2000 | Snow et al. | |
| 6,167,424 A * | 12/2000 | Bak et al. ................ | 718/100 |
| 6,484,185 B1 | 11/2002 | Jain et al. | |
| 7,302,684 B2 * | 11/2007 | Hsieh ..................... | 718/102 |
| 7,346,762 B2 | 3/2008 | Misra et al. | |
| 2002/0156786 A1 * | 10/2002 | Martin et al. ........... | 707/10 |
| 2003/0041173 A1 * | 2/2003 | Hoyle ..................... | 709/248 |
| 2005/0132374 A1 * | 6/2005 | Flood et al. ............. | 718/100 |
| 2005/0149936 A1 * | 7/2005 | Pilkington ............... | 718/102 |
| 2006/0173885 A1 * | 8/2006 | Moir et al. .............. | 707/101 |
| 2006/0225078 A1 * | 10/2006 | Anderson ................ | 718/104 |
| 2006/0248530 A1 * | 11/2006 | Ahmad et al. ........... | 718/102 |
| 2007/0168650 A1 * | 7/2007 | Misra et al. ............. | 712/220 |
| 2008/0005112 A1 * | 1/2008 | Shavit et al. ............. | 707/8 |
| 2009/0150898 A1 * | 6/2009 | Sohn et al. .............. | 718/105 |

* cited by examiner

*Primary Examiner* — Emerson Puente
*Assistant Examiner* — Charles Swift
(74) *Attorney, Agent, or Firm* — Blakely, Sokoloff, Taylor & Zafman LLP (57) ABSTRACT

Techniques for implementing an atomic FIFO queue and system for processing queue elements are described herein. According to one embodiment, in a first thread of execution, new data is atomically merged with existing data of an object via an atomic instruction associated with hardware that executes the first thread. An attempt is made to acquire ownership of the object (exclusive access). If successful, the object is enqueued on an atomic FIFO queue as a continuation element for further processing. Otherwise, another thread of execution is safely assumed to have acquired ownership and taken responsibility to enqueue the object. A second thread of execution processes the atomic FIFO queue and assumes ownership of the continuation elements. The second thread invokes a function member of the continuation element with a data member of the continuation element, the data member including the newly merged data. Other methods and apparatuses are also described.

22 Claims, 7 Drawing Sheets

METHOD AND APPARATUS FOR IMPLEMENTING ATOMIC FIFO

FIELD OF THE INVENTION

The present invention relates generally to computer systems. More particularly, this invention relates to atomic operations of queues.

BACKGROUND

It is common in multiprocessing and multithreaded computing environments for various executable units running on a computer system to concurrently execute multiple jobs scheduled in a queue, which is accessed by multiple threads and/or multiple executable units.

A common problem associated with using data structures in shared memory is managing multiple simultaneous requests to access the data structures and ensuring that accesses to the data are atomic. Additionally, guaranteeing atomic access is important because it ensures that multiple simultaneous attempts to update data do not conflict and leave the data in an inconsistent state.

Atomic access to a data structure can be guaranteed by the hardware when the data structure meets size and alignment restrictions imposed by the particular hardware (typically the size of a machine word or floating point number). Atomic access cannot be guaranteed by the hardware for data structures that do not meet these restrictions.

In order to guarantee consistent reads and writes of data structures larger than that supported by the hardware, previous systems have provided software mechanisms to guarantee atomic reads of data structures. One such system involves the use of a lock mechanism. In systems using a lock, a thread that requires access to a shared data structure first acquires a lock on the data structure, typically using a function provided by the operating system. The process then updates the data structure. After the data structure is updated, the requesting thread releases the lock. Other threads that require access to the data structure may also attempt to acquire a lock on the data structure. If an attempt occurs while another thread has the data structure locked, the attempt will fail, and the requesting thread will continue to retry acquisition of the lock, or wait until the lock becomes available with operating system support. In either approach, the thread of execution is blocked until the lock has been acquired.

While software locks allow exclusive and therefore consistent access to data structures, the blocking behavior of locks is expensive either in terms of CPU (central processing unit) or memory utilization. There has been a lack of efficient way to implement a FIFO (first-in first-out) queue in a non-blocking fashion using atomic operations.

SUMMARY OF THE DESCRIPTION

Techniques for implementing an atomic FIFO queue and system for processing queue elements are described herein. According to one embodiment, in a first thread of execution, new data is atomically merged with existing data of an object via an atomic instruction associated with hardware that executes the first thread. An attempt is made to acquire ownership of the object (exclusive access). If successful, the object is enqueued on an atomic FIFO queue as a continuation element for further processing. Otherwise, another thread of execution is safely assumed to have acquired ownership and taken responsibility to enqueue the object. Unlike traditional approaches, the process of merging new data and enqueuing the object is performed without requiring the first thread to wait for the object to become available for use. A second thread of execution processes the atomic FIFO queue and assumes ownership of the continuation elements. The second thread invokes a function member of the continuation element with a data member of the continuation element, the data member including the newly merged data. Thereafter, the ownership of the continuation element is released by the second thread. Finally, the second thread determines whether the atomic FIFO queue requires additional processing and repeats the process if necessary.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for implementing an atomic FIFO queue are described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
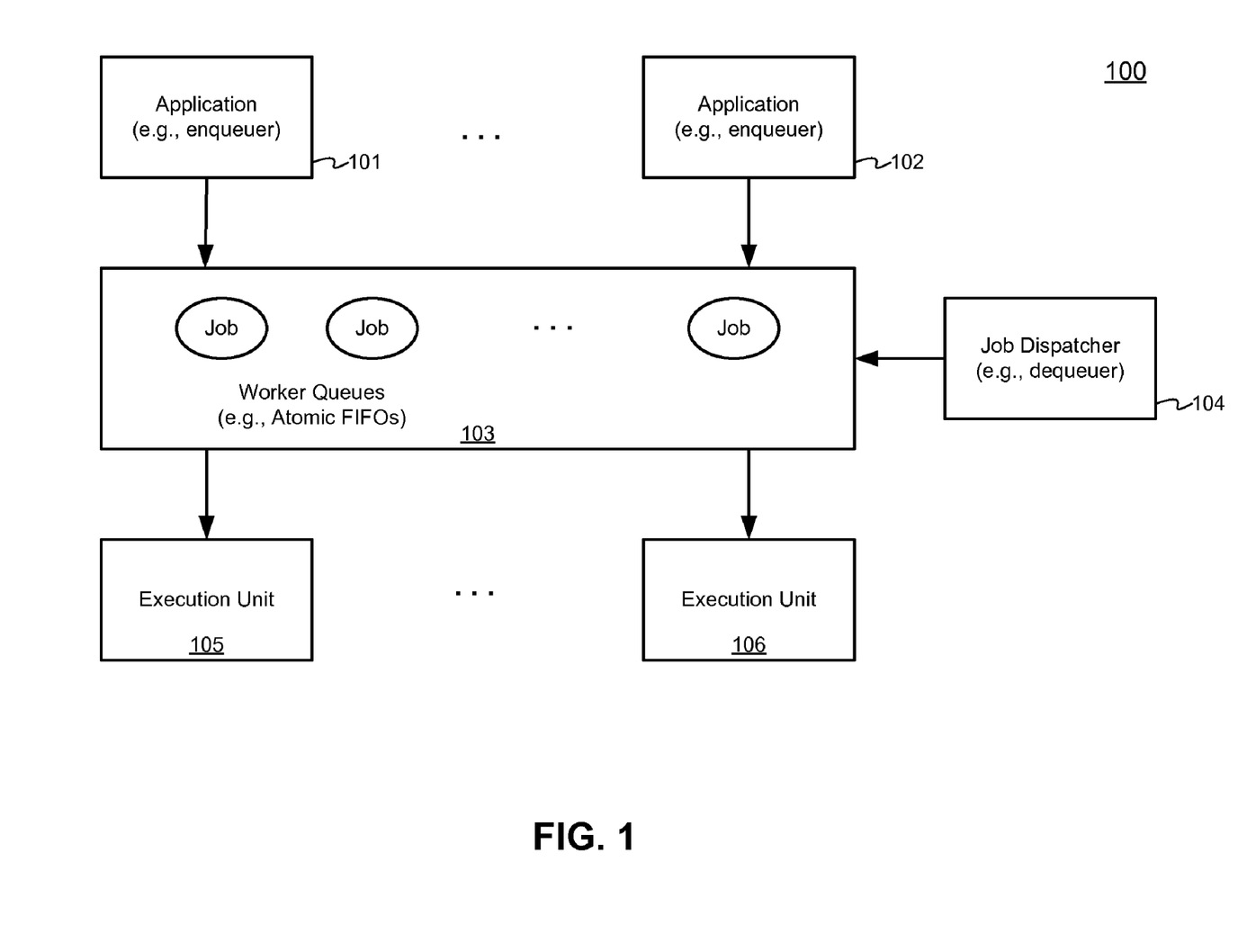
FIG. 1 is a block diagram illustrating a system using an atomic FIFO queue according to one embodiment of the invention.

According to certain embodiments, a system of atomic FIFO queues having a hierarchical structure is implemented, where each node of the hierarchy represents a job to be executed by an execution unit (e.g., processor or processor core). The jobs and atomic FIFO queues present in the hierarchy are collectively referred to as continuation elements. Processing of continuation elements begins at the root level (e.g., top level) of the hierarchy. Jobs at lower levels are processed as part of a traversal of the hierarchy. Each continuation element is processed as an individual job or as a series of jobs if the continuation element is itself an atomic FIFO queue. This processing is performed recursively for each successive level of the hierarchy. Priority is established based on the distance of a continuation element from the root level of the hierarchy, as continuation elements closest to the root level are processed first. A new continuation element can be inserted into any one of the levels of the hierarchy by enqueuing the element on an atomic FIFO present at that level FIG. 1 is a block diagram illustrating a system using atomic FIFO queues according to one embodiment of the invention. Referring to FIG. 1, system 100 includes one or more applications 101-102 having operations scheduled to be executed by one or more processing threads on execution units 105-106. The operations requested by applications 101-102 are scheduled as jobs pending in one or more atomic FIFO queues, as a whole, referred to as atomic FIFO queue 103. Jobs can be enqueued by one or more enqueuing threads and dequeued by a dispatcher thread 104 onto one or more processor threads on execution units 105-106. Typically, atomic FIFO queue 103 and job dispatcher 104 are implemented as part of an operating system, such as, Mac OS from Apple or Windows operating system from Microsoft. Execution units 105-106 may be implemented as part of multiple processors, processor core logic, or a combination thereof. Note that some or all components as shown in FIG. 1 may be implemented in software, hardware, or a combination thereof.

Figure 2:
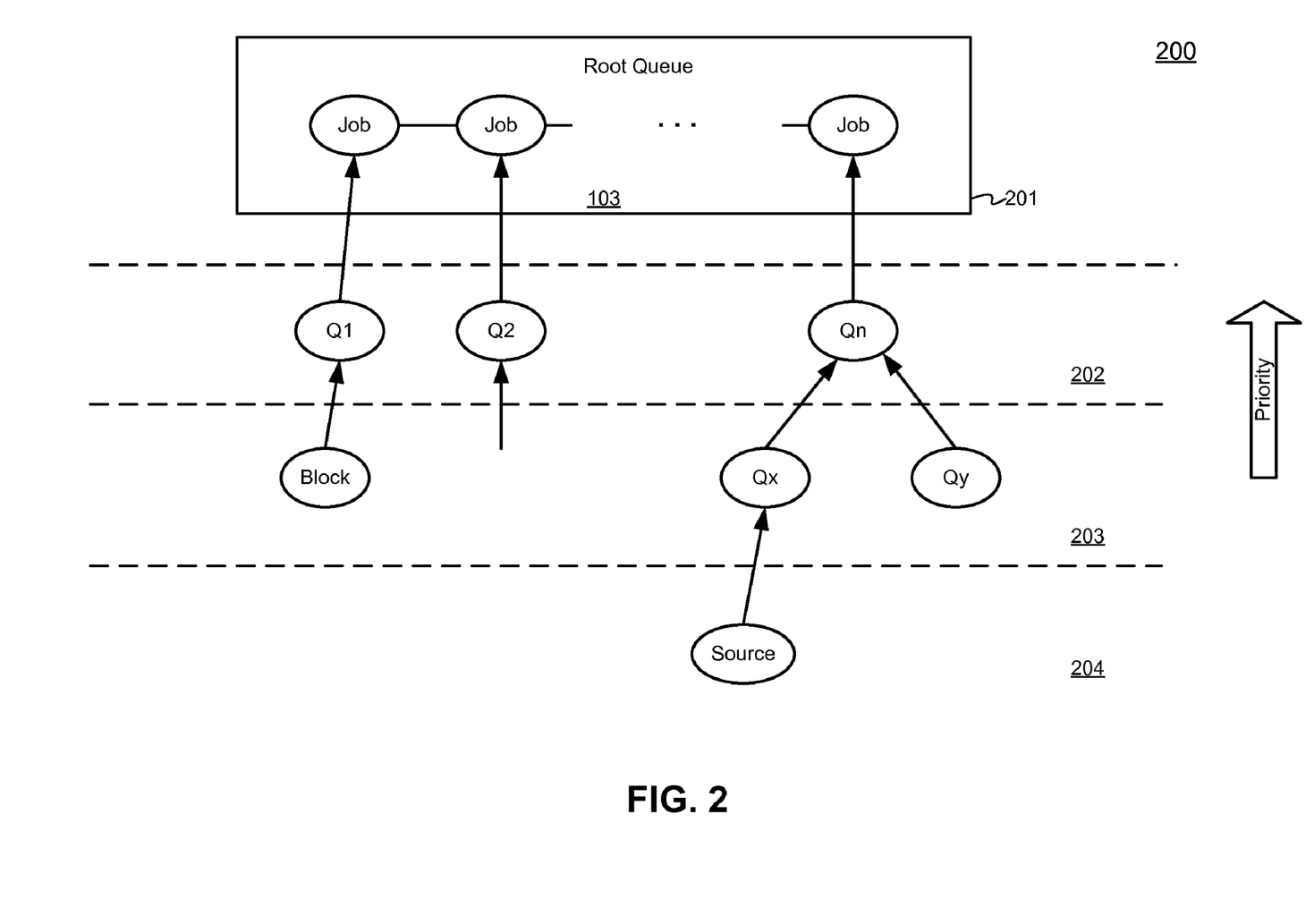
FIG. 2 is a diagram illustrating a hierarchical atomic FIFO queue architecture according to one embodiment of the invention.

A continuation element is represented by an object which includes one or more data members and one or more function members. When a continuation object is executed, one or more function members are invoked with data provided by one or more data members of the corresponding object. According to certain embodiments, atomic FIFO queues are themselves continuation elements (allowing them to be nested as shown in FIG. 2) and when invoked begin dequeuing and invoking the continuation elements of that queue.

According to one embodiment, a Boolean value (e.g., true or false) is stored within each continuation element object indicating whether the element is currently part of a linked list of an atomic FIFO queue. This Boolean value is referred to as a lock or lock bit and is updated via an atomic logical OR operation supported by the hardware. This lock bit should not be confused with common blocking synchronization mechanisms (e.g. mutex or spin lock). Instead, the following wait-free process is used: a thread of execution seeking to acquire ownership of the continuation element performs an atomic logical OR with a nonzero value on the lock. If the previous value of the lock is zero, then the thread is considered to have acquired ownership of the continuation element. Otherwise, if the previous value of the lock is nonzero, the continuation element is considered to be owned by another thread of execution and the attempt to acquire ownership has failed. Ownership can subsequently be released by the owning thread via writing a zero value to the lock.

According to one embodiment, an atomic FIFO queue includes a linked list of continuation elements in combination with a head pointer and tail pointer referencing the first and last continuation elements in the list respectively. A continuation element is enqueued on an atomic FIFO queue by updating the tail pointer with a reference to the continuation element via an atomic exchange instruction supported by the hardware. The continuation element referenced by the previous value of the tail pointer (if any) is then updated to link to the new continuation element, maintaining the linked list of continuation elements. Otherwise, if the previous value of the tail pointer did not reference any continuation element (the FIFO was empty), the head pointer of the atomic FIFO queue is updated.

When continuation elements are enqueued, the atomic FIFO queue must be associated with a dispatcher thread 104 for processing of the continuation elements. The thread enqueuing a continuation element attempts to acquire ownership bit of the atomic FIFO queue object. If ownership is successfully acquired, the thread becomes responsible for associating the atomic FIFO queue with a dispatcher thread. If the attempt to acquire ownership is unsuccessful, the thread can safely assume that another thread has acquired ownership and is responsible associating the atomic FIFO queue with a dispatcher thread.

As an optimization, according to one embodiment, the attempt to acquire ownership is only performed if the tail pointer of an atomic FIFO queue contains no previous value (e.g., logical value of true) at the time the continuation element was enqueued. Otherwise, it can be safely assumed that the first thread to enqueue a continuation element has acquired ownership and associated the atomic FIFO queue with a dispatcher thread as needed.

According to one embodiment, there can be multiple enqueuing threads and in general, one dequeuing thread per atomic FIFO queue. When a dispatcher thread 104 is created to process continuation elements enqueued on the root level, the dispatcher thread begins the processing of continuation elements as a processing thread. There may be multiple processing threads corresponding to multiple execution units 105-106 that process independent atomic FIFO queues substantially concurrently.

In addition, an optimization may be implemented when there are multiple enqueuing threads but only one dequeuing thread per atomic FIFO queue. According to one embodiment, the head and tail pointers of the atomic FIFO queue being processed may be cached locally by the execution unit before ownership of the atomic FIFO queue is released. Such an optimization decreases processor bus traffic by avoiding memory contention. This optimization can also avoid many processor memory barrier instructions, which impede hardware level performance enhancements (e.g., out-of-order execution).

According to one embodiment, atomic FIFO queue 103 is implemented to have a hierarchical structure including multiple levels of atomic FIFO queues and continuation elements, each having a different priority. A continuation element can be inserted into any level of the hierarchy. The hierarchy of the system is defined by the relationship of each atomic FIFO queue to a higher-level target atomic FIFO queue. When a continuation element is enqueued on any atomic FIFO queue in the hierarchy, the atomic FIFO queue is itself enqueued onto its target queue as a continuation element. The process of enqueuing an atomic FIFO queue onto its target queue within the hierarchy is repeated until ultimately an atomic FIFO queue is enqueued at the root level. When a continuation element is enqueued at the root level, the system begins the evaluation of whether to bring a new dispatcher thread 104 online to begin processing the continuation element. The decision to bring additional processing threads online may be dependent upon the available resources and bandwidth of the execution units 105-106.

FIG. 2 is a diagram illustrating a hierarchical atomic FIFO queue architecture. The atomic FIFO queue hierarchy 200 may be implemented as part of atomic FIFO queue 103 of FIG. 1. Referring to FIG. 2, the atomic FIFO queue hierarchy 200 includes one or more levels 201-204, each level having a different priority. Each level includes one or more jobs, or atomic FIFO queues of jobs, collectively referred to as continuation elements. For example, root level 201 has a higher priority than the remaining levels 202-204.

A job can be enqueued at any level 201-204 by an enqueuing thread. When continuation elements are enqueued onto an atomic FIFO queue, the atomic FIFO queue itself must be enqueued onto its target queue in the hierarchy for further processing as a continuation element. In order to enqueue the atomic FIFO queue, the thread enqueuing the first continuation element attempts to acquire ownership of the atomic FIFO queue. If ownership is successfully acquired, this thread becomes responsible for enqueuing the atomic FIFO queue onto its target queue. If the attempt to acquire ownership is unsuccessful, the thread can safely assume that another thread has acquired ownership and is responsible for enqueuing the atomic FIFO queue onto its target queue.

As an optimization, according to one embodiment, the attempt to acquire ownership is only performed if the tail pointer of an atomic FIFO queue contains no previous value (e.g., NULL pointer) at the time the continuation element was enqueued. Otherwise, it can be safely assumed that the first thread to enqueue a continuation element has acquired ownership and enqueued the atomic FIFO queue onto its target queue as needed.

The system of hierarchical atomic FIFO queues can work with one thread or multiple threads. If the hierarchy of FIG. 2 is interpreted as a tree, a single thread can process the queues in a manner consistent with a "depth-first" traversal of the tree. However, typically, multiple threads may be utilized (determined by a variety of factors such as how many execution units are available on the hardware, and whether the currently running threads are busy or idle) and each continuation element enqueued at the root level may be processed independently by its own thread.

Figure 3:
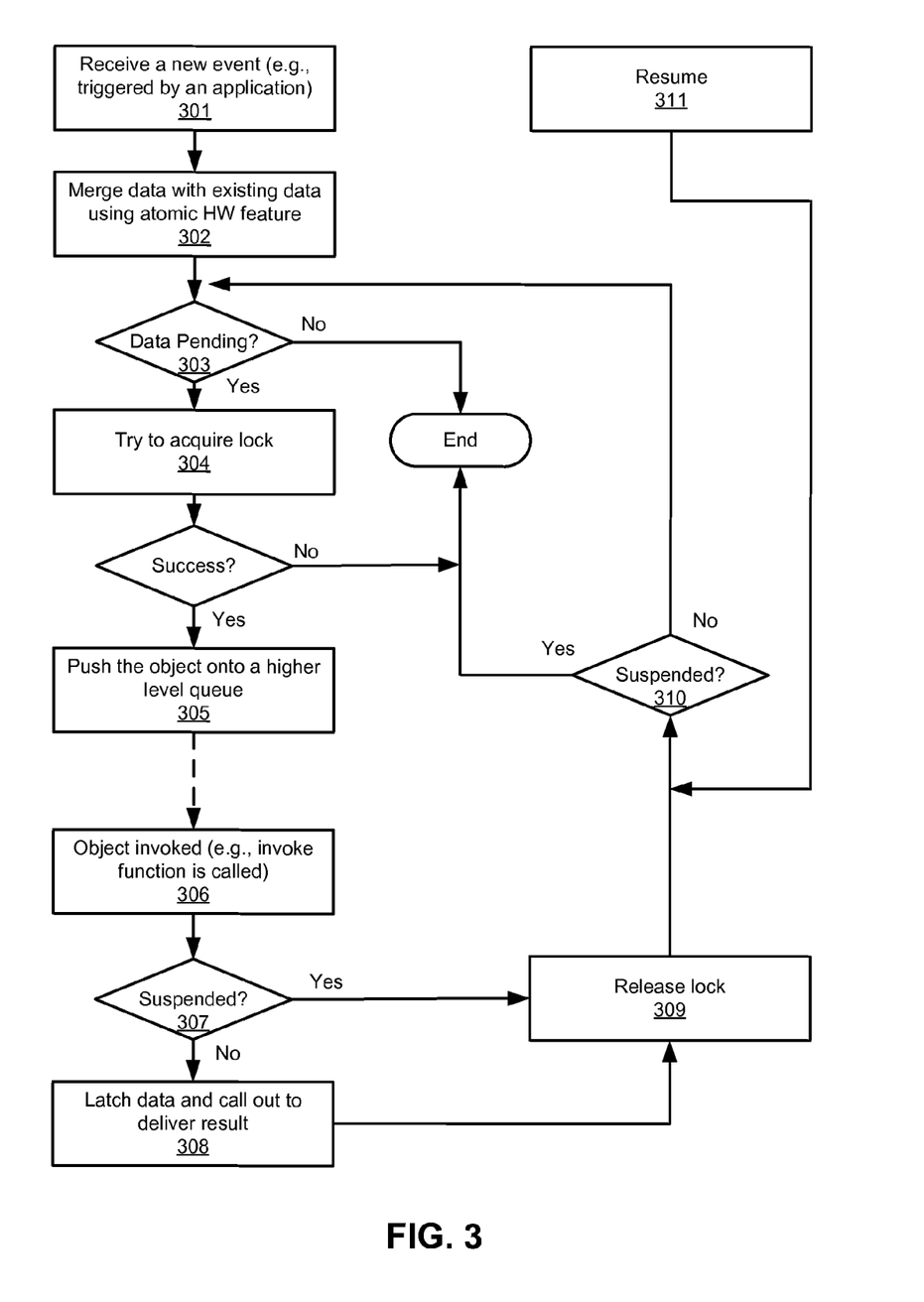
FIG. 3 is a flow diagram illustrating a process of enqueuing and invoking continuation elements according to one embodiment.

FIG. 3 is a flow diagram illustrating a process of atomically updating data contained in an object and submitting the object as a continuation element to a target queue for further processing according to one embodiment. Note that process 300 may be performed by processing logic which may include software, hardware, or a combination of thereof. For example, process 300 may be performed by system 100 of FIG. 1 or by system 200 of FIG. 2. Referring to FIG. 3, at block 301, a new event is received which may indicate that an object is to be updated with application data and enqueued onto a particular atomic FIFO queue for further processing. In one embodiment, an object may specify a target queue (e.g., a particular atomic FIFO queue in a hierarchy such as levels 202-204 of FIG. 2 which may be indicated by a queue ID such as target queue ID 705 of FIG. 6) for the corresponding object to be processed. At block 302, data of the new event may be atomically merged with the existing data of an object using an atomic feature or instruction available from the hardware (e.g., processor or processor core). The object is then enqueued into a queue.

According to one embodiment, for objects that track a bitmask of status flags (where each bit represents a particular event), this merge operation may be carried out via an atomic logical OR operation. For objects that track a count of the number of times an event has occurred, this merge operation may be carried out via an atomic ADD operation. For objects that deliver data (e.g., bytes available to read), this merge operation may be carried out via an atomic EXCHANGE operation. In this case, a previous value is ignored and a new value is swapped in (e.g., object specific data 708 of data structure 701 as shown in FIG. 6).

Alternatively, the new event may indicate that a continuation element is to be enqueued onto an atomic FIFO queue. In this case, an atomic exchange operation may be performed on the tail pointer of the atomic FIFO queue (e.g., tail pointer 710 of data structure 701 as shown in FIG. 6). The tail pointer is set to the newly enqueued continuation element and the previous tail's "next" pointer (e.g., next object pointer 704 of FIG. 6) is also updated to refer to the new continuation element. As mentioned above, each item is associated and represented via a data structure (e.g., object) having certain data members and function members, which will be described in details further below.

Referring to back to FIG. 3, at block 303, processing logic checks whether the current object has any pending data to be processed. For the first pass of the enqueuing thread, the pending data may be the same as the data just merged at block 302. However, for event source objects that track a bitmask of status flags, it is possible to monitor only a subset of all possible events (e.g., all bits). In this case, the pending data check performed herein can only be true if the recently merged event coincides with the mask of monitored status flags (e.g., logical AND).

Figure 6:
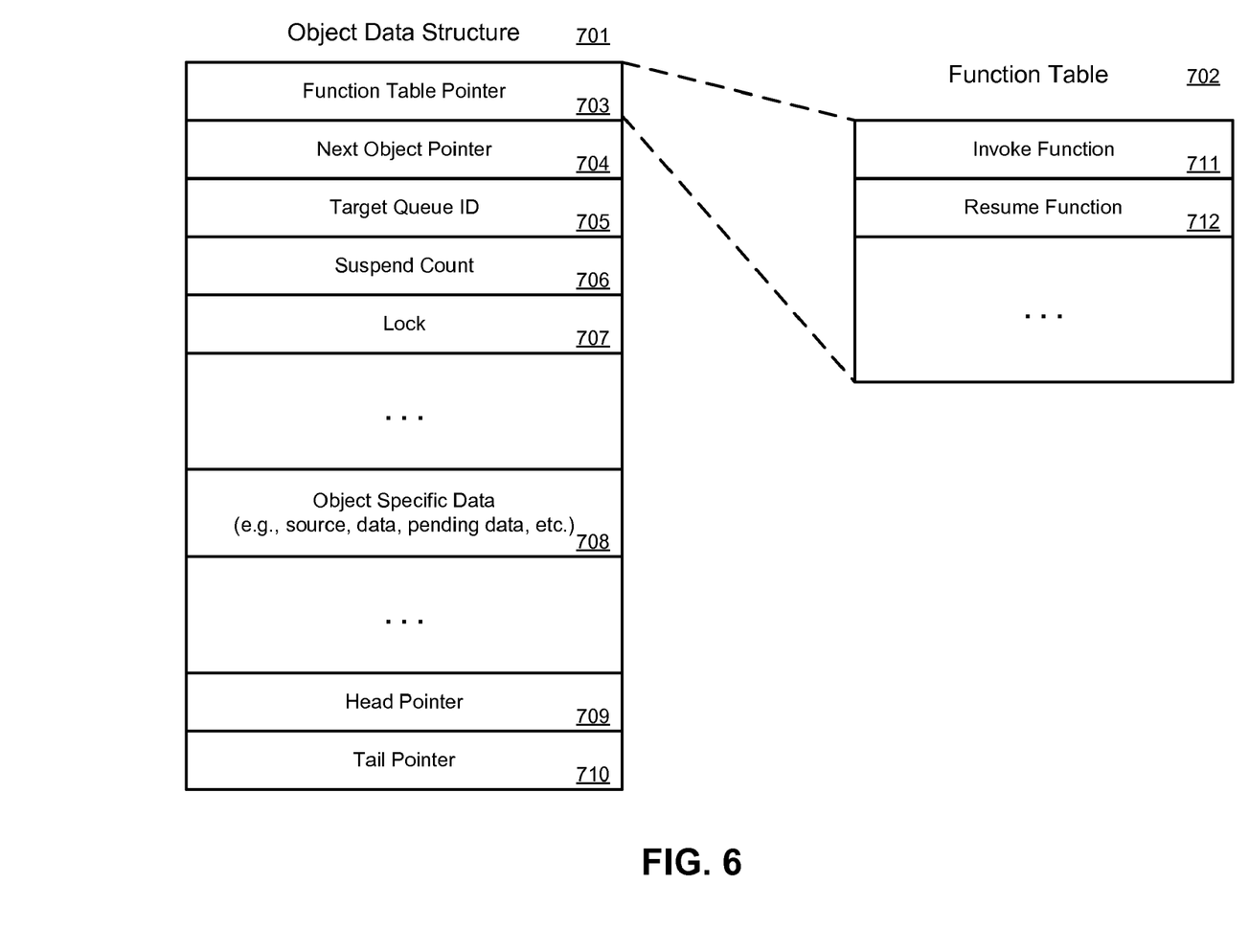
FIG. 6 is a block diagram illustrating a data structure associated with an object according to one embodiment.

In order to ensure that there is only one thread access the object at a time, at block 304, processing logic attempts to acquire ownership of the object via a lock (e.g., lock 707 of FIG. 6). If the current thread successfully acquires ownership, it becomes responsible for enqueuing the object onto its target queue at block 305. The current thread may end (e.g., after releasing ownership by writing a zero value to the lock) once the object has been enqueued onto its target queue. Otherwise, if ownership cannot be acquired successfully, the current thread ends its processing of the object as it can be safely assumed that the owning thread has enqueued the object onto its target queue.

According to one embodiment, the operations involved in blocks 301-305 may be repeated, either by the same thread or by another thread, recursively for each atomic FIFO queue at each level (e.g. levels 202-204 in FIG. 2) until an atomic FIFO queue is enqueued at the root level (e.g. level 201 in FIG. 2). For example, the enqueuing operation involved in block 305 may correspond to a new event that triggers the operations of block 301-305 for that higher-level atomic FIFO queue.

If the current level is the root level, a new dispatcher thread (e.g., dispatcher thread 104) may be created from block 305, which eventually resumes at block 306 as indicated via a dash line. At block 306, the object is invoked by calling an invoke function of the object (e.g., invoke function 711 of FIG. 6). Thus, block 306 is a system-provided entry point for processing an object on one of the processing threads (e.g., 105-106 in FIG. 1).

At block 307, processing logic checks whether the object has been suspended. For example, an application may suspend an object to temporarily suppress the processing of new events. In one embodiment, when an object is suspended, a data member such as suspend count 706 of FIG. 6 of the corresponding data object is incremented via an atomic increment instruction provided by hardware. When an application resumes an object, its suspend count is decremented via an atomic decrement instruction provided by hardware. Thus, processing logic can check whether the object has been suspended by examining the suspend count of the object. If the object has been suspended (e.g., suspend count is greater than zero), the current processing thread ends after releasing the lock at block 309.

If the object has not been suspended (e.g., suspend count equals to zero), at block 308, the object is processed. For event source objects, the application-provided code is executed in response to the event. For atomic FIFO queues, block 308 is where the continuation elements on the linked list are processed (effectively starting at block 306 for each of the continuation elements). Once the object has been processed, the lock is reset and ownership is released at block 309 to allow other threads to access the object. After the ownership has been released, at block 310, processing logic may check again to determine whether the object has been suspended. If the object is not suspended and has pending data (that was merged in the midst of the aforementioned processing), the object may be re-enqueued onto its target queue. Note that although checking of suspension has been performed at block 307, subsequent suspension checking at block 310 may be needed if the application-provided code executed at block 308 changes the suspended status of the object.

After an object has been suspended, the object can be resumed to enter the loop at block 311 by calling its resume function such as resume function 712 of FIG. 6. Thus, block 311 is performed in response to an application request to resume an object. An attempt to resume an object may simply subtract one from the suspend count of the object. The suspension check operation of block 310 is performed by examining the suspend count of the object after the resume from block 311. If the suspend count is zero, the object is put back into the loop for processing at blocks 303-305, etc.

Figure 4:
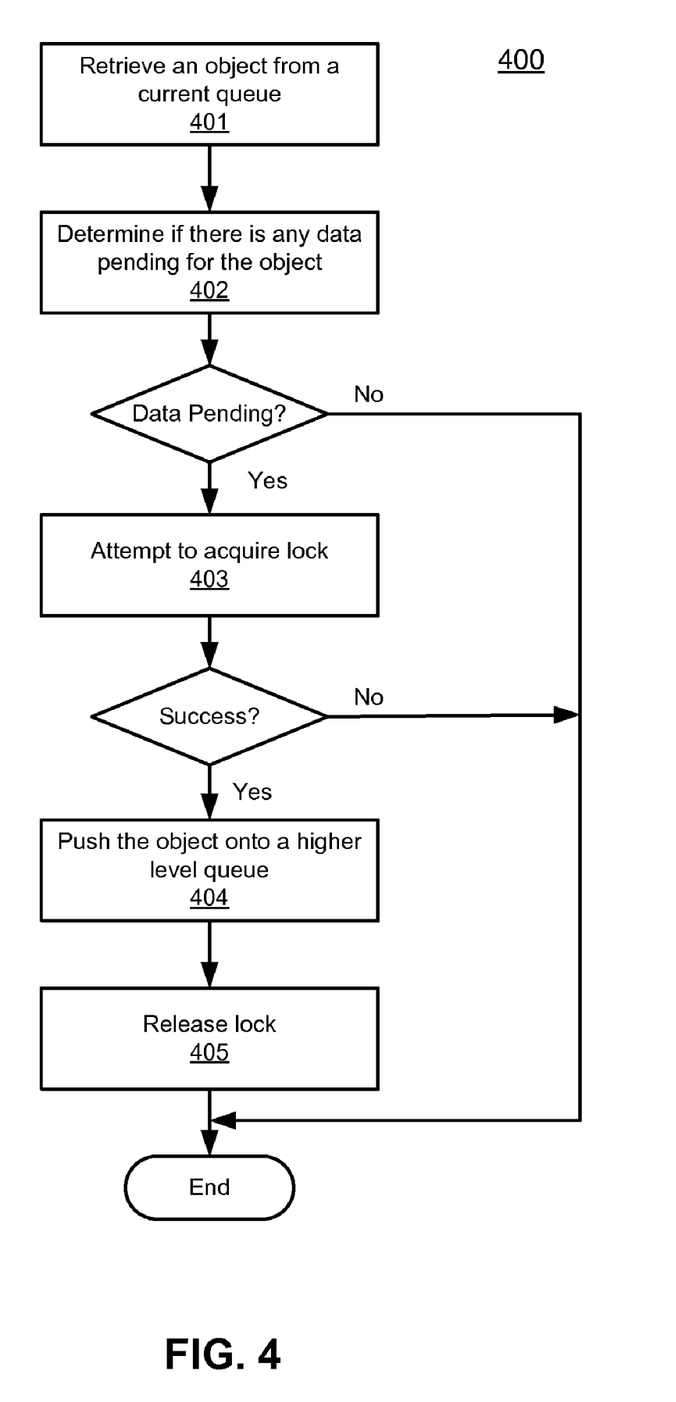
FIG. 4 is a flow diagram illustrating a process for enqueuing continuation elements according to one embodiment.
Figure 5:
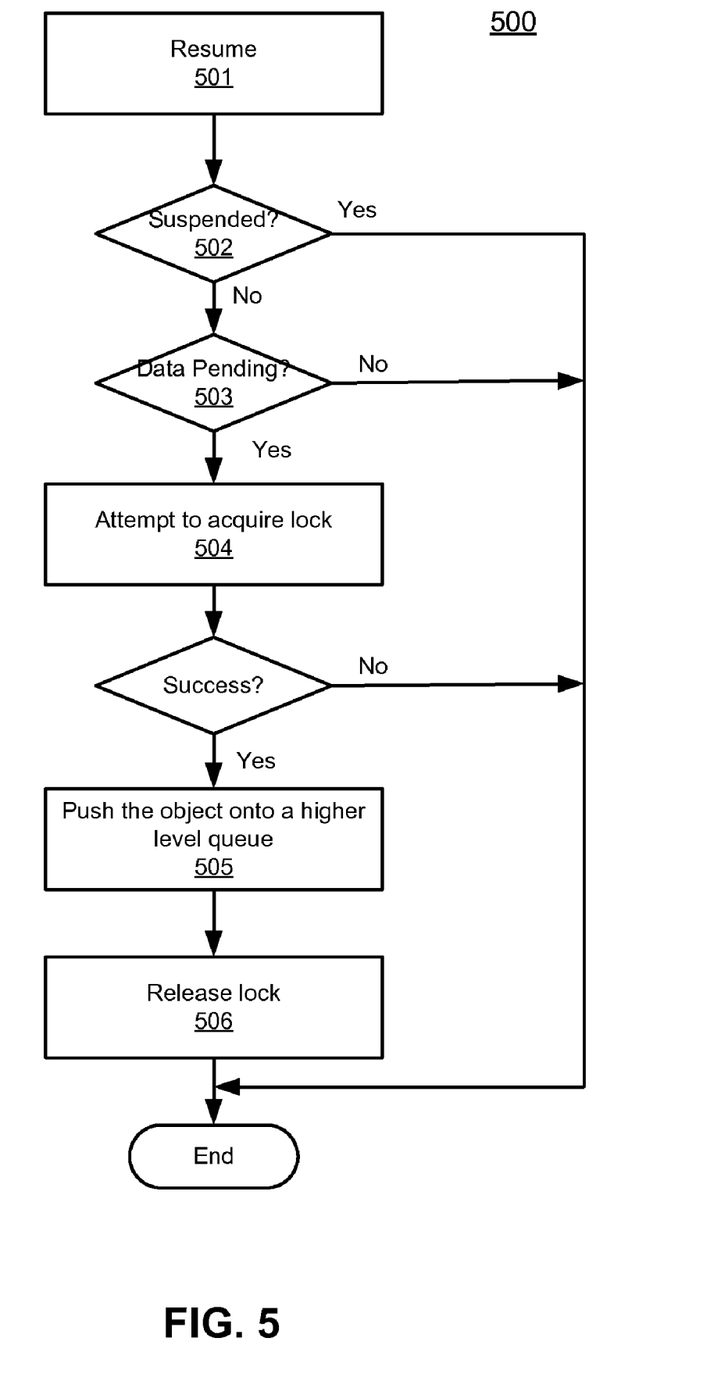
FIG. 5 is a flow diagram illustrating a resume process according to one embodiment.

Therefore, as described above, process 300 represents an overall process of enqueuing and dequeuing operations of continuation elements in general, where a continuation element could be data generated from the application code, operating system event sources, or alternatively the enqueuing of a continuation element onto an atomic FIFO queue. For example, entry point at block 301 is provided to an application in response to an event to enqueue a continuation element as shown in FIG. 4. Entry point at block 311 is provided for a resume process to enqueue a continuation element as shown in FIG. 5.

According to one embodiment, operations of blocks 301-305 may be executed on the same thread, which could be any thread that initiates a new event, for example, an application request to perform an operation asynchronously. These blocks may also be executed recursively as each object is enqueued onto its target queue (e.g., a higher level target atomic FIFO queue) in the hierarchy as shown in FIG. 2. For example, operations of blocks 305 in FIG. 3 for queue Qy of FIG. 2 (e.g., level 203) corresponds to operations of block 301 for queue Qn of FIG. 2 (e.g., level 202). The terminating case for the recursion is either reaching the end block, or reaching block 305 for a root queue, in which case a new processing thread 105-106 may be brought online. Blocks 306-310 and 303-305 may be executed on the same thread (referred to as a processing thread), which is likely to be a different thread than where the event was initiated in block 301. Block 311 may happen on any thread via an application request to resume an object. Note that throughout this application, a lock is utilized as a mechanism to obtain an exclusive access to an object. However, it is not so limited; other mechanisms such as semaphore or mutex (which may be implemented in software, hardware, or a combination thereof) may also be implemented.

FIG. 4 is a flow diagram illustrating a process for enqueuing continuation elements according to one embodiment. Note that process 400 may be performed by processing logic which may include software, hardware, or a combination thereof. For example, process 400 may be part of operations involved in blocks 301-305 of FIG. 3. In one embodiment, a thread associated with a particular level of queue may "walk" through all objects in the queue in an attempt to move certain objects to a higher-level queue (e.g., dequeuing from a current level and enqueuing onto a higher level). Processing logic of the thread may start with the head of the queue (e.g., via head pointer 709 of FIG. 6) or the tail of the queue (e.g., via tail pointer 710 of FIG. 6).

Referring to FIG. 4, at block 401, an object is invoked, for example, by calling an invoke function of the object. At block 402, processing logic determines whether there is any pending data for the object. If not, the processing logic moves to a next object in the queue (e.g., following a next object pointer 704 of FIG. 6). If there is pending data, at block 403, processing logic attempts to acquire a lock (e.g., lock 707 of FIG. 6) for exclusive access of the object. If the lock is acquired successfully, at block 404, the object is pushed (e.g., inserted) onto a higher-level queue and thereafter the lock is release at block 405. The object may be inserted into a tail of the higher-level queue and the corresponding pointers of the object and the adjacent objects (e.g., head and tail pointers 709-710, next object pointer 704 of FIG. 6) may also be updated. Once the lock has been released or the lock cannot be acquired successfully, the processing logic moves on to the next object in the list. Other operations may also be performed.

FIG. 5 is a flow diagram illustrating a resume process according to one embodiment. Note that process 500 may be performed by processing logic which may include software, hardware, or a combination thereof. For example, process 500 may be part of operations involved in blocks 311 and 303-305 of FIG. 3. Process 500 may be invoked when processing logic resumes processing of the object, for example, by calling a resume function (e.g., resume function 712 of FIG. 6) of the object. Referring to FIG. 5, when the object is resumed at block 501, processing logic checks whether the object is suspended by examining the corresponding suspend count of the object at block 502. Note that whenever an object is suspended, the suspend count of the object is incremented via an atomic increment hardware instruction and whenever an object is resumed, its suspend count is decremented via an atomic decrement hardware instruction. In this case, processing logic examines the suspend count to determine whether the suspend count is zero, which indicates that the object is not suspended.

If the object is not suspended, at block 503, processing logic determines whether there is any pending data to be processed for the object. If not, there is no need to enqueue the object and the current thread exits or moves on to a next object in the chain. If there is pending data, at block 504, processing logic attempts to acquire the lock for exclusive access to the object. If the lock cannot be acquired successfully, it is assumed that another thread is handling the object. Therefore, the current thread exits or moves on to a next object in the chain. If the lock is acquired successfully, at block 505, processing logic pushes the object onto a higher-level queue if the current level is not the root level. Thereafter, at block 506, the lock is released to allow other threads to access the object. If the current level is the root level, the current thread may exit and another thread may be launched.

Note that each of the processes 400 and 500 may be performed via an individual thread. These threads may be simultaneously running. However, only one thread can enqueue an object onto its target queue as a continuation element at a time by successfully acquiring the lock associated with the object.

FIG. 6 is a block diagram illustrating a data structure associated with an object according to one embodiment. Referring to FIG. 6, the data structure includes one or more data members 701 and one or more function members 702. Data structure 701 includes a function table pointer 703 pointing to function table 702 which includes, but is not limited to, an invoke function pointer 711 and a resume function pointer 712 pointing to their respective functions. Data structure 701 further includes a next object pointer 704 and head and tail pointers 709-710. As mentioned above, each continuation element is associated with an object represented by a data structure as shown in FIG. 6. All continuation elements are chained as a linked list in a queue. Each data structure includes a head pointer 709 pointing to the head of the linked list and a tail pointer 710 pointing to the tail of the linked list. The next object pointer 704 points to an immediate adjacent object so that processing logic can "walk" through the chain via next object pointer 704.

Target queue ID 705 indicates which queue the object is currently associated with. As described above, when a continuation element is dispatched, it can be inserted into any level of queues by specifying a target queue ID. Such a target queue ID is stored as a data member 705. Suspend count 706 is used to indicate whether the corresponding object has been suspended. Whenever an object is suspended, its suspend count 706 is incremented via an atomic increment hardware instruction and whenever an object is resumed, its suspend count is decremented via an atomic decrement hardware instruction. Lock 707 is used to provide an exclusive access to the corresponding object. A non-zero value of lock 707 may indicate that the corresponding object is being handled by another thread or that the object is already a member of the linked list associated with its target queue. Note that suspend count 706 and lock 707 may be implemented within the same byte or word. For example, lock 707 may occupy one or more bits (e.g., bit 0) while suspend count 706 occupies the remaining bits of the byte or word. Data area 708 is used to store any pending data, for example, merged via an atomic instruction available from the hardware.

According to one embodiment, an invoke function is called by the thread(s) processing elements on a queue. For an atomic FIFO queue, the invoke function processes all continuation elements on that the linked list which is what yields the recursive depth-first traversal of the atomic FIFO queue hierarchy in system 200 of FIG. 2. The resume function 712 is responsible for checking the current suspension status of an object as well as determining whether there is any pending data for the object (and thus whether the object is in need of being enqueued on its target queue for processing).

Figure 7:
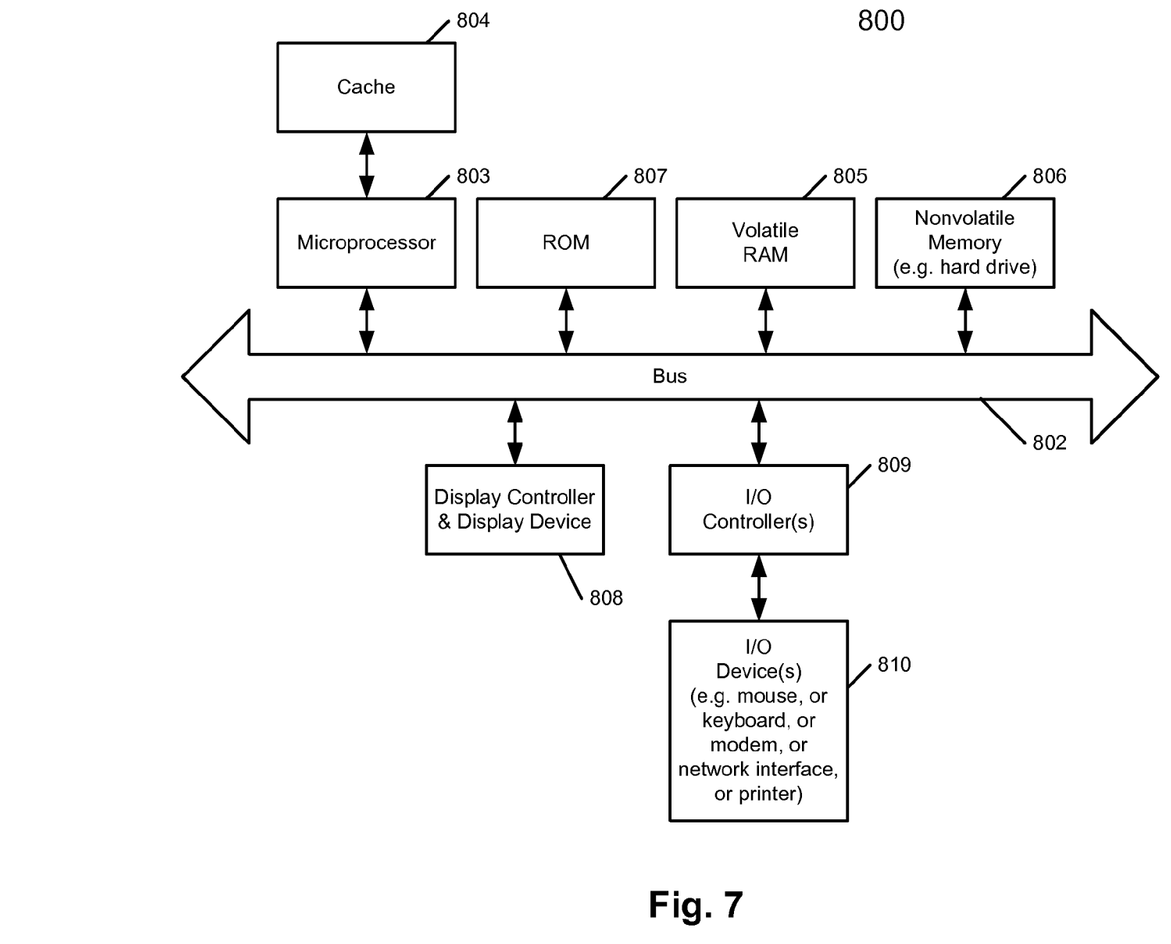
FIG. 7 is a block diagram of a data processing system, which may be used with one embodiment of the invention.

FIG. 7 is a block diagram of a data processing system, which may be used with one embodiment of the invention. For example, the system 800 shown in FIG. 7 may be used as systems 100 of FIG. 1. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple Macintosh computer or MacBook, or an IBM compatible PC.

As shown in FIG. 7, the computer system 800, which is a form of a data processing system, includes a bus or interconnect 802 which is coupled to one or more microprocessors 803 and a ROM 807, a volatile RAM 805, and a non-volatile memory 806. The microprocessor 803 is coupled to cache memory 804. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as is well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Thus, techniques for implementing an atomic FIFO queue have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method performed by a multi-processing system having multiple execution units capable of executing multiple threads concurrently, the method comprising:
   in a first thread of execution:
      atomically merging new data with existing data of an object via an atomic instruction associated with hardware that executes the first thread, and
      attempting to acquire exclusive access to the object, and if successful, enqueuing the object as a continuation element onto a first queue having a list of continuation elements pending therein, the first queue being associated with a first priority, wherein the first queue is one of a plurality of queues, each queue being associated with a different priority and containing therein a plurality of continuation elements pending to be processed, and wherein the plurality of queues are processed by a plurality of threads executed independently with each other;
   in a second thread of execution which is executed independently with respect to the first thread:
      for each of the continuation elements of the first queue, attempting to acquire an exclusive access of the continuation element,
      if the exclusive access has been acquired successfully, dequeuing the continuation element from the first queue,
      enqueuing the continuation element into a second of the plurality of queues, wherein the second queue is associated with a second priority that is higher than the first priority, and
      releasing the exclusive access of the continuation element thereafter;
   in a third thread of execution which is executed independently with respect to the first thread and second thread:
      for each of a plurality of continuation elements in the second queue, attempting to acquire exclusive access to each continuation element,
      if the exclusive access of the continuation element has been successfully acquired, executing a function member of the continuation element using a data member of the continuation element,
      terminating the exclusive access to the continuation element after the execution, and
      determining whether additional data was merged by a fourth thread of execution and restarting the process of the continuation elements pending in the second queue if there is additional data merged by the fourth thread.

2. The method of claim 1, wherein atomically merging new data with the existing data is atomically performed without having to acquire exclusive access to the object.

3. The method of claim 1, further comprising:
   for each of the continuation elements in the first queue, determining whether the continuation element has been suspended by another thread; and
   releasing the exclusive access of the continuation element without dequeuing it from the first queue, if the continuation element has been suspended by another thread.

4. The method of claim 3, wherein determining whether the continuation element has been suspended comprises examining a suspend count as a data member of the continuation element to determine whether the suspend count is greater than a predetermined threshold, wherein the continuation element is considered suspended if the associated suspend count exceeds the predetermined threshold.

5. The method of claim 3, further comprising, for each of the continuation elements in the first queue, determining whether the continuation element includes data pending to be processed, wherein the continuation element is pushed onto the second queue if there is data pending.

6. The method of claim 4, wherein the suspend count is incremented when the corresponding continuation element is suspended by a thread.

7. The method of claim 1, wherein the plurality of queues are arranged in a hierarchical structure, including a root level queue having the highest priority and a plurality of lower level queues each having a different lower priority.

8. The method of claim 7, wherein continuation elements are dequeued from a lower level queue onto a higher level queue by a plurality of threads according to a schedule of the respective threads, and wherein only continuation elements in the root level queue are executed.

9. A machine-readable storage medium storing instructions, which when executed by a machine, cause a machine to perform a method of a multi-processing system having multiple execution units capable of executing multiple threads concurrently, the method comprising:
   in a first thread of execution:
      atomically merging new data with existing data of an object via an atomic instruction associated with hardware that executes the first thread, and
      attempting to acquire exclusive access to the object, and if successful, enqueuing the object as a continuation element onto a first queue having a list of continuation elements pending therein, the first queue being associated with a first priority, wherein the first queue is one of a plurality of queues, each queue being associated with a different priority and containing therein a plurality of continuation elements pending to be processed, and wherein the plurality of queues are processed by a plurality of threads executed independently with each other;
   in a second thread of execution which is executed independently with respect to the first thread:

for each of the continuation elements of the first queue, attempting to acquire an exclusive access of the continuation element, if the exclusive access has been acquired successfully, dequeuing the continuation element from the first queue, enqueuing the continuation element into a second of the plurality of queues, wherein the second queue is associated with a second priority that is higher than the first priority, and releasing the exclusive access of the continuation element thereafter;

in a third thread of execution which is executed independently with respect to the first thread and second thread:

for each of a plurality of continuation elements in the second queue, attempting to acquire exclusive access to each continuation element, if the exclusive access of the continuation element has been successfully acquired, executing a function member of the continuation element using a data member of the continuation element, terminating the exclusive access to the continuation element after the execution, and determining whether additional data was merged by a fourth thread of execution and restarting the process of the continuation elements pending in the second queue if there is additional data merged by the fourth thread.

10. The machine-readable storage medium of claim 9, wherein atomically merging new data with the existing data is atomically performed without having to acquire exclusive access to the object.

11. The machine-readable storage medium of claim 9, further comprising:

for each of the continuation elements in the first queue, determining whether the continuation element has been suspended by another thread; and releasing the exclusive access of the continuation element without dequeuing it from the first queue, if the continuation element has been suspended by another thread.

12. The machine-readable storage medium of claim 11, wherein determining whether the continuation element has been suspended comprises examining a suspend count as a data member of the continuation element to determine whether the suspend count is greater than a predetermined threshold, wherein the continuation element is considered suspended if the associated suspend count exceeds the predetermined threshold.

13. The machine-readable storage medium of claim 11, further comprising, for each of the continuation elements in the first queue, determining whether the continuation element includes data pending to be processed, wherein the continuation element is pushed onto the second queue if there is data pending.

14. The machine-readable storage medium of claim 12, wherein the suspend count is incremented when the corresponding continuation element is suspended by a thread.

15. The machine-readable storage medium of claim 9, wherein the plurality of queues are arranged in a hierarchical structure, including a root level queue having the highest priority and a plurality of lower level queues each having a different lower priority.

16. The machine-readable storage medium of claim 15, wherein continuation elements are dequeued from a lower level queue onto a higher level queue by a plurality of threads according to a schedule of the respective threads, and wherein only continuation elements in the root level queue are executed.

17. A system, comprising:

a memory; and a processor to execute a first thread in the memory to atomically merge new data with existing data of an object via an atomic instruction associated with hardware that executes the first thread, attempt to acquire exclusive access to the object, and if successful, enqueue the object as a continuation element onto a first queue having a list of continuation elements pending therein, the first queue being associated with a first priority, wherein the first queue is one of a plurality of queues, each queue being associated with a different priority and containing therein a plurality of continuation elements pending to be processed, and wherein the plurality of queues are processed by a plurality of threads executed independently with each other;

execute a second thread in the memory which is executed independently with respect to the first thread to for each of the continuation elements of the first queue, attempt to acquire an exclusive access of the continuation element, if the exclusive access has been acquired successfully, dequeue the continuation element from the first queue, enqueue the continuation element into a second of the plurality of queues, wherein the second queue is associated with a second priority that is higher than the first priority, and release the exclusive access of the continuation element thereafter;

execute a third thread in the memory independently with respect to the first thread and the second thread to for each of a plurality of continuation elements in the second queue, attempt to acquire exclusive access to each continuation element, if the exclusive access of the continuation element has been successfully acquired, execute a function member of the continuation element using a data member of the continuation element, terminate the exclusive access to the continuation element after the execution, and determine whether additional data was merged by a fourth thread of execution and restarting the process of the continuation elements pending in the second queue if there is additional data merged by the fourth thread.

18. The system of claim 17, wherein atomically merging new data with the existing data is atomically performed without having to acquire exclusive access to the first continuation element.

19. The system of claim 17, wherein for each of the continuation elements in the first queue, the second thread is to determine whether the continuation element has been suspended by another thread, and to release the exclusive access of the continuation element without dequeuing it from the first queue if the continuation element has been suspended by another thread.

20. The system of claim 19, wherein determining whether the continuation element has been suspended comprises examining a suspend count as a data member of the continuation element to determine whether the suspend count is greater than a predetermined threshold, wherein the continuation element is considered suspended if the associated suspend count exceeds the predetermined threshold.

21. The system of claim 19, wherein for each of the continuation elements in the first queue, the second thread is to determine whether the continuation element includes data pending to be processed, wherein the continuation element is pushed onto the second queue if there is data pending.

22. The system of claim 20, wherein the suspend count is incremented when the corresponding continuation element is suspended by a thread.

* * * * *